United States Patent
Du Rees

[19]

[11] Patent Number: 6,105,731
[45] Date of Patent: Aug. 22, 2000

[54] BRAKING DEVICE FOR WHEELED CHAIRS

[75] Inventor: Stephan Du Rees, Lidingo, Sweden

[73] Assignee: Mercado Medic AB, Sweden

[21] Appl. No.: 08/836,106

[22] PCT Filed: Sep. 3, 1996

[86] PCT No.: PCT/SE96/01089

§ 371 Date: May 5, 1997

§ 102(e) Date: May 5, 1997

[87] PCT Pub. No.: WO97/09023

PCT Pub. Date: Mar. 13, 1997

[30] Foreign Application Priority Data

Sep. 5, 1995 [SE] Sweden .................................. 9503058

[51] Int. Cl.[7] .............................. A61G 5/10; B32B 5/04
[52] U.S. Cl. ................................. 188/2 F; 188/5
[58] Field of Search .................................. 188/5, 6, 7, 8, 188/19, 2 F, 20, 21, 22; 297/338, 354.12; 280/304.1, 250.1, 763.1, 43.26, 43.17, 47.34, 79.3, 33.994, 79.11, 43.22; 182/15; 108/106; 248/158, 188.1, 188.2, 354.6, 163.1, 354.1; 10/33, 35 R

[56] References Cited

U.S. PATENT DOCUMENTS 2,185,073  12/1939  Chamberlain .............................. 280/44
3,288,250  11/1966  Oja et al. ..................................... 188/5
4,302,025  11/1981  Waddell et al. ........................ 280/79.1

FOREIGN PATENT DOCUMENTS 204040   12/1986  European Pat. Off. .
1517718   6/1966  France ........................................ 188/5
270067    5/1927  United Kingdom ....................... 188/5
2108605   5/1983  United Kingdom .

Primary Examiner—Douglas C. Butler
Attorney, Agent, or Firm—Ostrolenk, Faber, Gerb & Soffen, LLP

[57] ABSTRACT

The invention relates to a braking device for wheeled chairs, the device (1) including at least two brake legs (2, 3) which can be lowered to, or raised from a substructure while being positionally movement-oriented with the aid of tubular members (4, 5) fixed to the chair frame, these vertical leg movements being actuable via urging structure (6, 7) situated above the respective brake leg for performing a turning movement with the aid of a shaft (8), to which they are fixed, this movement resulting in one direction in arresting the chair moving the legs (2, 3) downwards into their braking position, and in the opposite direction in upward movement of the legs into their inactive position. The urging structure comprise cams (9; 10) having their turning axis (11) coincident with the longitudinal axis of the shaft (8) to which they are fixed, their profiles (12; 13) having an elongate S-shape, and coact with the upper parts (16, 17) of the legs for obtaining maximum lifting height of the leg free ends (14, 15) from the substructure.

5 Claims, 2 Drawing Sheets

BRAKING DEVICE FOR WHEELED CHAIRS

This application is being filed pursuant to 35 U.S.C. §371 as the national stage filing of PCT/SE96/01089, filed Sep. 3, 1996.

The present invention relates to a braking device for wheeled chairs, the device including at least two brake legs, which are lowerable and retractable in accommodating tubular members disposed on the chair frame for positionally oriented vertical leg movement to, and from a substructure, this movement being actuated by urging means situated above each leg, and fastened to a shaft such as to perform turning movements moving the legs to, and from their braking position when the braking device is activated or deactivated.

In structures of a similar type, including brake legs for arresting the movement of a wheeled chair, there have been problems when the chair passes over thresholds and the like, since the legs in their inactive positions have got caught in such obstructions during passage of the chair. This has resulted in that when the obstruction has a height great enough for the legs to get entangled with it, the person sitting on the chair has much trouble with extrication from this situation, without help from another person.

The object of the present invention is to achieve a braking device of the kind where the brake legs, in their inactive positions, are at a height above the substructure which is sufficient to prevent them from catching on thresholds or other objects projecting up from the substructure, while maintaining effective and simple actuation of the legs. The distinguishing features of the invention are disclosed in the accompanying claims.

Due to the invention, there has now been achieved a braking device for a wheeled chair that meets its objectives in an excellent manner, while being simple and cheap to manufacture. The urging means for each leg comprises a cam, which, due to its special implementation, obtains a very large amount of travel for the vertical movement of the leg. Accordingly, the cam profile is formed as an elongate S, which not only affords long leg travel, but also ease of cam operation. Since the bottom of the leg may now lie well above any expected obstruction projecting from the substructure when the leg is in its retracted, or inactive position, there are no longer any problems with the legs catching on such obstructions, e.g. thresholds, during passage of the chair over them.

The invention will now be described in more detail below with the aid of a preferred embodiment example, and with reference to the accompanying drawings, where:

Figure 2:
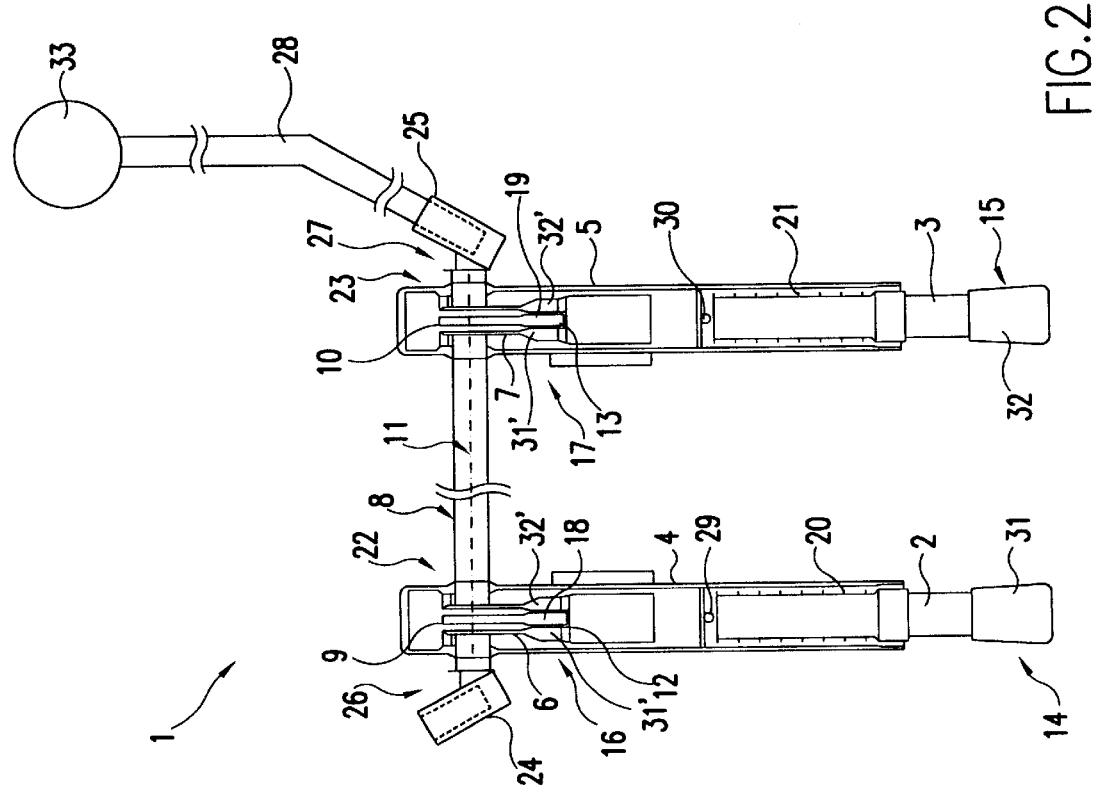
FIG. 2 is a sectional side view along the line II—II in FIG. 1.
Figure 1:
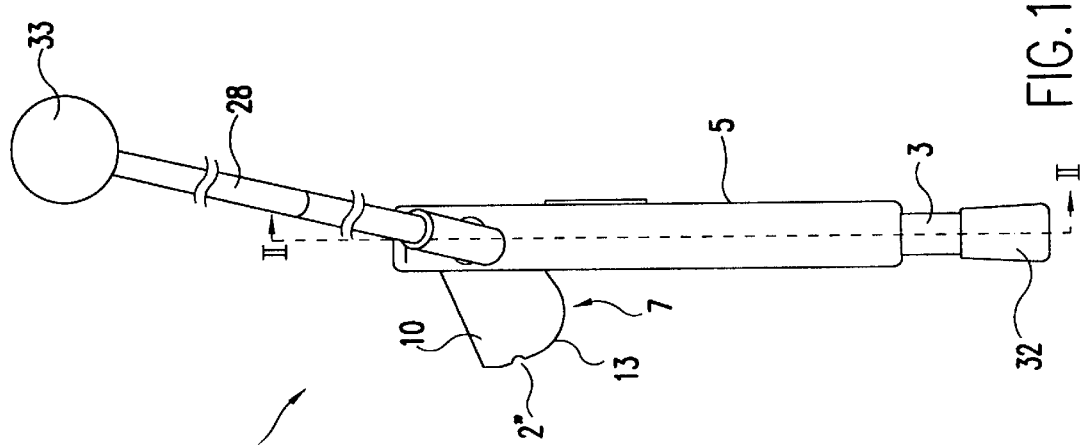
FIG. 1 is a side view of the inventive braking device, when its legs are in a retracted state.
Figure 3:
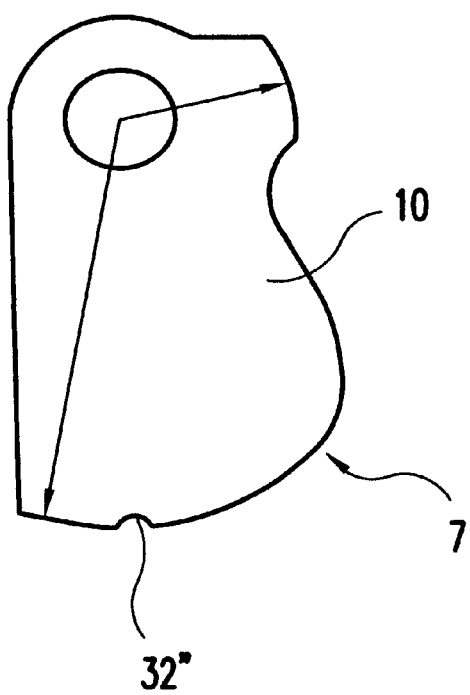
FIG. 3 is an exclusive side view of the cam in accordance with the invention.
Figure 4:
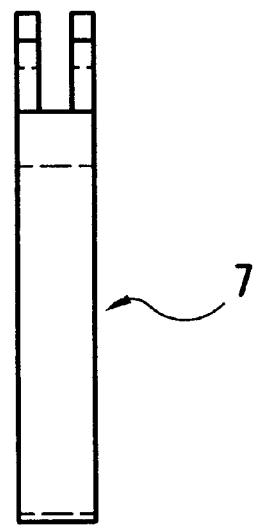
FIG. 4 is an end view of the cam in FIG. 3.

In FIGS. 1 and 2 will be seen an inventive embodiment of a braking device 1 intended for a wheeled chair, and including at least two legs 2, 3, which are lowerable against, and raisable from a substructure, e.g. a floor. The legs 2, 3 are positionally, vertically oriented in their movement by their accommodation in tubular members 4, 5 fixed to the chair frame. Leg movement is actuated by urging means 6, 7, which are situated above the respective leg and are caused to turn by a shaft 8, to which they are fixed. Turning the means 6, 7 anti-clockwise, as seen in FIG. 1, causes the means to urge legs 2, 3 downwards into contact with the substructure for arresting movement of the chair.

The urging means 6, 7 comprise cams 9 and 10, which have their turning axes coincident with the axis 11 of the shaft 8 and are fixed to it. The cams 9, 10 have their profiles 12, 13 coacting with ball bearings 18, 19 accomodated in the upper parts 16, 17 of the legs 2, 3, the profiles being formed with an elongate S configuration for obtaining maximum travel of the free ends 14, 15 of the legs from the substructure. In the upper, inactive position of the legs, where the wheeled chair is not braked, the ball bearings 18, 19 engage against the inwardly curved portion of the cam profiles 12, 13. The legs are urged upwardly into engagement with the cam profiles with the aid of helical springs 20, 21.

For achieving as great a lifting height as possible for the legs 2, 3 the vertical travel of the legs substantially corresponds to the radius of the radial turning movement of the cams, and this turning radius is substantially twice as long as the lateral extension of the cam profile from a vertical plane through the turning axis 11, when the cam is in its downwardly turned, vertical position. In order to keep the friction between profiles 12, 13 and the upper parts 16, 17 of the legs 2, 3 as small as possible, the legs are provided with the already-mentioned ball bearings 18, 19. These are fitted on bearing supports 31' and 32' on the respective leg.

The shaft 8 is rotatably mounted in the upper portions 22, 23 of the tubular members 4, 5 and extends beyond them at either end 26, 27. At least one lever retainer 24, 25 is fixed to the respective end 26, 27, and accommodates a brake lever 28 provided at its free end with a knob 33 for facilitating its operation. This lever can thus be inserted optionally in retainer 24 or 25. For preventing the legs 2, 3 from turning in the tubular means 4, 5 the latter are each provided with a longitudinal groove in its bore, for coaction with the respective pin 29, 30 fixed to the legs 2, 3. The grooves are not shown on the drawing.

The free ends 14, 15 of the legs are provided with pads 31, 32 for obtaining gentle and effective engagement against the substructure.

The braking device in accordance with the present invention functions in the following way. In its inactive state, the legs 2, 3 of the device are in an upper position, and are kept there by the bias from helical compression springs 20, 21 housed in the tubular members 4, 5. Thus, when the brake is applied the brake lever 28 is manually pushed or pulled in an anti-clockwise direction in FIG. 1, which turns the shaft 8. In its movement the shaft takes with it the cams, their profiles working against the ball bearings to urge the legs downwards into their active positions with their braking pads 31, 32 engaging against the substructure. For releasing the brake, the lever 28 is moved in a clockwise direction, the legs moving upwards as their bearings follow the cam profiles, which is ensured by the action of the springs urging the upper parts 16, 17 in an upward direction. This spring bias also ensures that the ball bearings are kept against the profile part with the least radius to the rotational axis 11, i.e. the legs are kept in their highest position. A notch 32" is provided in the cam profile at its maximum radius to the turning axis 11, i.e. when the brake is fully "on". This fixes the cam in relation to the bearing until force is applied to the brake lever, thus ensuring against untoward movement of the cam, since spring bias urges the bearing against the notch. Instead the manual operation of the lever 28, an electrically driven means may be arranged to actuate the shaft 8.

I claim:

1. A braking device for a wheeled structure having a frame, the braking device comprising:

at least two brake legs which are vertically movable between a fully lowered position and a fully retracted position;

at least two tubular members adapted to be attached to the frame, each tubular member corresponding to a respective brake leg for guiding the vertical movements of the respective brake leg;

a shaft rotatable mounted in the tubular members and extending laterally through each side of the wheeled structure;

a lever adapted to be attached to either side of the shaft which extends laterally through each side of the wheeled structure for turning the shaft; and at least two cams, each cam corresponding to a respective brake leg and having a turning axis, a length, a width, and an elongated S-shaped profile in which the length is substantially twice the width, wherein each cam is attached to the shaft through its respective turning axis such that the brake legs can be moved between the fully lowered position and the fully retracted position by turning the shaft with the lever to actuate the cams to obtain a maximum lift height of the brake leg substantially corresponding to the length of the cam, and wherein the fully retracted position corresponds to each brake leg interacting with a point along the upper concave portion of the S-shaped profile of the respective cam, and wherein the fully lowered position corresponds to the brake leg interacting with a point along the lower convex portion of the S-shaped profile of the respective cam.

2. The braking device as recited in claim 1, further comprising at least two ball bearings, each ball bearing disposed between an upper end of a respective brake leg and a corresponding cam for minimizing friction between the brake leg and the cam during the vertical movements of the brake leg along the cam profile.

3. The braking device as recited in claim 1, further comprising at least two helical springs, each spring corresponding to a respective brake leg for spring-biasing the brake leg toward the retracted position.

4. The braking device as recited in claim 1, wherein each brake leg includes a guide pin, and wherein each tubular member includes a longitudinal groove along an interior thereof, each guide pin slidable in a corresponding groove to guide the vertical movements of the respective brake leg.

5. A wheelchair including a braking device, the wheelchair comprising:

a chair frame;

a shaft rotatably mounted in the frame and extending laterally through at least one side of the frame;

a lever attachable to the shaft extending laterally through the frame for turning the shaft;

at least two brake legs which are vertically movable between a fully lowered position and a fully retracted position; and at least two cams, each cam corresponding to a respective brake leg and having a turning axis and an elongated S-shaped profile having a length and a width such that the length is substantially twice the width, and wherein each cam is attached to the shaft through its respective turning axis such that the brake legs can be moved between the fully lowered position and the fully retracted position by turning the shaft with the lever to actuate the cams to obtain a maximum lift height of the brake legs substantially corresponding to the length of the cams, and wherein the fully retracted position corresponds to each brake leg interacting with a point along the upper concave portion of the S-shaped profile of the respective cam, and the fully lowered position corresponds to the brake leg interacting with a point along the lower convex portion of the S-shaped profile of the respective cam.

* * * * *